April 14, 1942.  G. A. LYON  2,279,332
ORNAMENTAL TRIM RING
Filed Jan. 21, 1939  2 Sheets-Sheet 1
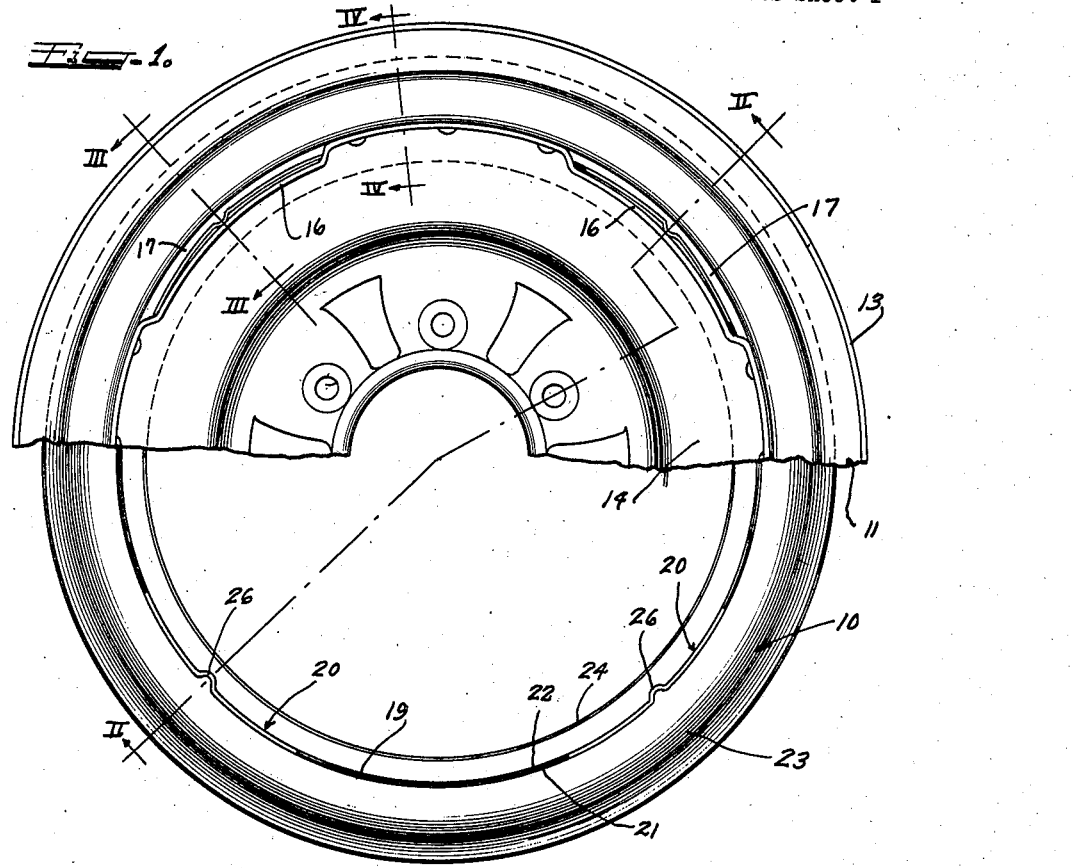
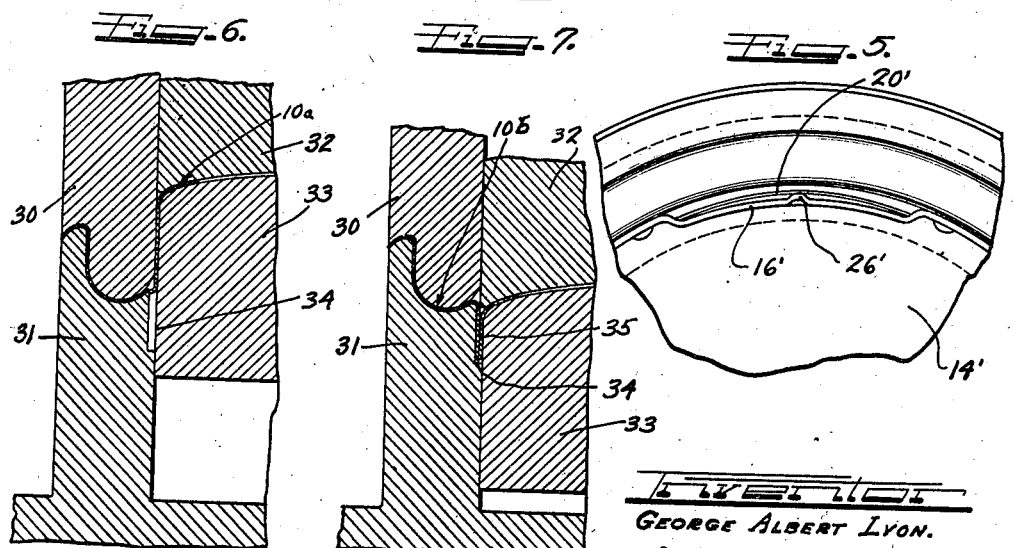
George Albert Lyon.

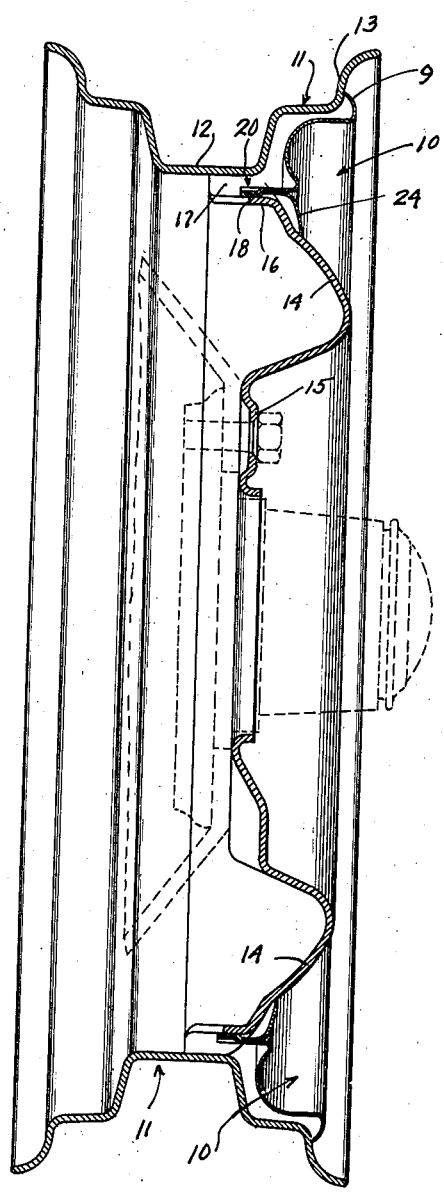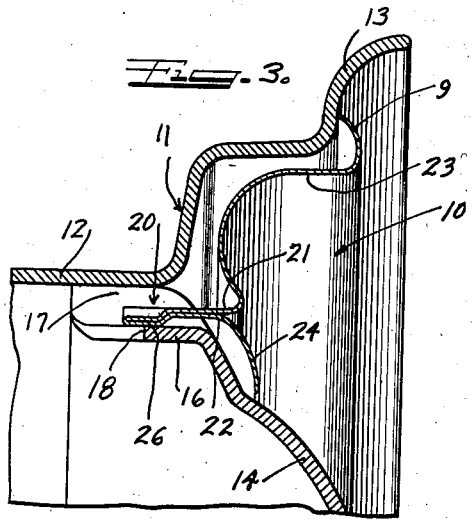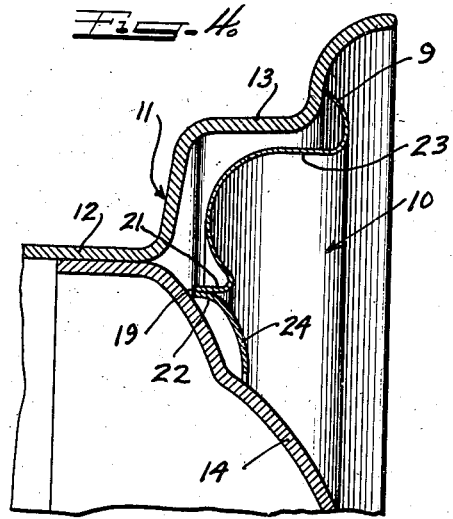

Patented Apr. 14, 1942

2,279,332

UNITED STATES PATENT OFFICE 2,279,332

ORNAMENTAL TRIM RING

George Albert Lyon, Allenhurst, N. J.

Application January 21, 1939, Serial No. 252,098

8 Claims. (Cl. 41—10)

The present invention pertains to ornamental members for wheels and more particularly to an ornamental trim ring with reinforced double thickness retaining means adapted for a snap-on engagement with the wheel.

An object of this invention is to provide an ornamental trim ring for wheels with reinforcing means for strengthening the retaining fingers thereof and which reinforcing means may be economically manufactured by a simple punch press operation.

A further object of this invention relates to the provision of a wheel construction including a wheel having rim and body members and an ornamental trim member cooperable therewith and having an intermediate rearwardly projecting annular collapsed skirt notched out to provide retaining means for cooperation with one of the wheel members.

In accordance with the general features of this invention, there is provided a wheel construction including a wheel having rim and body members, the rim member including a base flange over which the inner periphery of a tire is adapted to be disposed, and the wheel body member having a plurality of circumferentially spaced openings in its outer periphery adjacent its junction with the base flange and an ornamental circular trim member for disposition over an outer side of the wheel having a plurality of rearwardly extending resilient arcuate projections formed integral on a circular rear edge of the rim member and arranged to extend into the openings, said edge being part of a collapsed double thickness intermediate annular section of the trim member.

Another feature of the invention relates to the construction of the retaining means which is such that it may be formed from a double thickness rearwardly projecting skirt by the cutting out of portions leaving arcuate curved segments which are flexible relative to the main portion of the ring for the purpose of retaining the ring member on the wheel.

A further feature of the invention relates to the humping of an intermediate portion of the retaining projection so as to provide a point of contact in the projection whereby other and side portions of the projection are flexible in response to the pressure applied to the point of contact thereof in the application of the ring member to the wheel.

Other objects and features of this invention will more fully appear from the following detailed description taken in connection with the accompanying drawings which illustrate several embodiments thereof, and in which:

Figure 1 is a rear side view of a wheel construction embodying the present invention and partly broken away in order to show the coaction of the retaining means of the trim member with the wheel body member;

Figure 2 is an enlarged cross sectional view taken on the line II—II of Figure 1, looking in the direction indicated by the arrows and showing the wheel applied to a suitable support;

Figure 3 is an enlarged fragmentary sectional view corresponding to a top portion of Figure 2 and taken on the line II—II of Figure 1, looking in the direction indicated by the arrows;

Figure 4 is an enlarged cross sectional view corresponding to the lower portion of Figure 2, and taken on the line IV—IV of Figure 1 looking in the direction indicated by the arrows;

Figure 5 is a fragmentary side view corresponding to a portion of Figure 1, only illustrating a modification of the invention;

Figure 6 is a diagrammatic view illustrating the manner in which the intermediate skirt of the ring member is provided and showing the first step of the operation; and Figure 7 is a view similar to Figure 6, and showing the second step of the operation in which the intermediate portion of the middle of the ring member is collapsed to provide the double thickness skirt from which the retaining means for the trim member are formed.

As shown in the drawings:

The reference character 10 designates generally an ornamental trim member or ring embodying the features of this invention. This ring member may be formed from any suitable material, such, for example, as metal sheet or strip. It may, for example, be formed from strip stock by cutting a section of the strip and welding the ends thereof together so as to form an annulus. Then again, it may be formed by blanking the ring from suitable metallic sheet. Irrespective of what operations are employed to form the ring, it is, of course, appreciated that the margins of the same must be turned and worked to provide the structure illustrated and described hereinafter.

The outer edge of the ring member, as illustrated in Figures 2 and 3, is slightly curved back upon the main body of the ring as indicated at 9 so as to form a contacting edge adapted to bear against one of the side flanges 13 of the conventional drop center tire rim member 11. The wheel with which this ring is adapted to cooperate, in addition to the tire rim member 11, includes a body or hub member 14 suitably riveted, welded, or otherwise secured to the base flange 12 of the wheel rim member.

This body member has its outer peripheral margin provided with a plurality of spaced depressed sections 16 which, as shown in Figure 1, may be four in number or of any other suitable number as desired. These depressed sections 16 provide axially extending openings 17 in the wheel body adjacent the junction of the wheel body member with the rim member. The openings provide for the circulation of air through the wheel so as to allow circulating air to reach the conventional brake drum (not shown) associated with the support of the wheel.

The trim member 10 includes an outer curved section 23, from which the turned edge 9 is formed, and the curved inner section 24. These two sections 23 and 24 are joined together by integral rearwardly projecting portions 21 and 22 which comprise a single skirt from which the resilient retaining projections are formed. In reality this skirt constitutes a double thickness skirt and is made by the collapsing of an intermediate annular section of the metal comprising the ring member 10.

The collapsing operation is briefly described hereinafter in connection with Figures 6 and 7 solely for the purpose of illustrating how this part of the trim member is made, it being understood that the collapsing operation is being claimed in a copending process application of the application, Serial No. 211,781, filed June 4, 1938.

The double thickness rearwardly projecting annular skirt has a plurality of openings or cut out sections 19 leaving spaced rearwardly projecting resilient fingers or projections 20 which correspond in number with the number of openings 17 in the wheel body member 14. Each of these resilient double thickness projections 20 has an intermediate or centrally depressed portion 26, which constitutes the contact part of the projection or finger, and which contact part is adapted to engage the rear edge portion or shoulder 18 of the corresponding depressed section 16 of the wheel body member. This arrangement is such as to leave the portions of each finger or projection 20 on the sides of the central contact part 26 spaced from the corresponding depression 16 whereby greater flexibility is provided in the projection to enable it to have a snug and tight retaining engagement with the corresponding depression 16 in the wheel body member 14.

In the application of the trim ring to the wheel, it is pressed in an axial direction onto the outer side of the wheel with the projections 20 aligned with the corresponding openings 17 in the wheel body member 14. Upon axial pressure being applied to the trim ring member 10, it is forced home into a retained position by reason of the fact that the fingers are cammed or deflected in the course of their travel through the openings. That is to say, each of the projections 16 of the wheel body member exerts a corresponding cam action on the flexible finger 20 whereby that finger is tightly and frictionally bound thereto. The double thickness of the finger strengthens the finger 20 and enables a tight coaction between the respective parts. Moreover, the material constituting the ring 10 is of such a nature that the projections of fingers 20 have sufficient resiliency that they can be deflected in the act of mounting the ring on the wheel where-by the high points or contact parts 26 of these fingers will tightly embrace the four depressed sections 16 or the wheel body member. In other words, the contact parts 26 are all disposed in a common circle normally of a diameter slightly less than the outermost diameter of the depressed sections 16 so that as the disk is pushed home into retained position, the projections 20 must flex outwardly in order for the contact parts 26 to slide inwardly into their retaining positions.

In Figure 5, I have illustrated a slight modification of the invention in which the contact or humped central part 26' is provided in the depressed section 16' of the wheel body member 14', instead of in the resilient projection 20. With this exception, the structure and operation of this form of the invention is substantially the same as the previously described one.

I shall now proceed to describe briefly the manner in which the collapsed double thickness skirt, from which the fingers 20 are formed, is provided. This forming operation is diagrammatically illustrated in Figures 6 and 7.

From Figure 6, it will be perceived that a partially pre-formed metallic ring 10a is disposed between the upper die members 30 and 32 and the lower die members 31 and 33. The outer die members 30 and 31 are adapted to grip the outer section of the ring, whereas the inner die members 32 and 33 are relatively movable from the upper position illustrated diagrammatically in Figure 6 to the lower position illustrated diagrammatically in Figure 7. The lower outer die member 31 has an annular groove or notch 34 formed in its side facing the inner die member 33. As a consequence, during the downward relative movement of the die members 32 and 33 with reference to the die members 30 and 31, an intermediate portion of the ring 10a is progressively collapsed or folded into the groove 34 to form a ring 10b (Figure 7) having a double thickness skirt 35.

My reason for illustrating diagrammatically this formation of the double thickness skirt is to illustrate the character of the skirt which the ring has so that its metallurgical characteristics will be better appreciated. As noted before, however, this process of forming the double thickness skirt is claimed in a previously filed copending application.

I claim as my invention:

1. As an article of manufacture, an ornamental trim ring for a wheel including a rim member having a plurality of radial flanges as well as a base flange and a body member including a plurality of spaced apertures at its junction with the rim member, said trim ring having an inner turned edge provided with a plurality of spaced resilient projections adapted to extend through said apertures and to each embrace an inner and concealed shoulder of one of said members for retaining the ring on the wheel, said projections being separated by cut out sections in said turned edge and being adapted to be snapped into retaining engagement upon application of the ring in an axial direction to the wheel, said turned edge comprising a collapsed intermediate annular portion of said trim ring.

2. As an article of manufacture, an ornamental trim ring for a wheel including a rim member having a plurality of radial flanges as well as a base flange and a body member including a plurality of spaced apertures at its junction with the rim member, said trim ring having an inner turned edge provided with a plurality of spaced resilient projections adapted to extend through said apertures and to each embrace an inner and concealed shoulder of one of said members for retaining the ring on the wheel, said projections being separated by cut out sections in said turned edge and being adapted to be snapped into retaining engagement upon application of the ring in an axial direction to the wheel, each of said projections having a raised intermediate portion for bearing against said shoulder, said turned edge comprising a collapsed intermediate annular portion of said trim ring, and said cut out sections being made in said collapsed portion.

3. As an article of manufacture, an ornamental trim ring for a wheel including a rim member having a plurality of radial flanges as well as a base flange and a body member including a plurality of spaced apertures at its junction with the rim member, said trim ring having an inner portion provided with a plurality of spaced resilient projections adapted to extend through said apertures and to each embrace an inner and concealed shoulder of one of said members for retaining the ring on the wheel, said fingers being adapted to be snapped into retaining engagement upon application of the ring in an axial direction to the wheel, said fingers each comprising an integral extension on said inner portion of arcuate configuration in both longitudinal and transverse directions, said resilient projections being provided in a collapsed double thickness portion of said ring projecting rearwardly therefrom.

4. As an article of manufacture, an ornamental trim member for a wheel including a rim member having a plurality of radial flanges as well as a base flange and a body member including a plurality of spaced openings at its junction with the rim member, said trim member comprising a metallic circular member provided with a collapsed double thickness integral annular skirt projecting rearwardly therefrom and including a plurality of rearwardly extending flexible projections and of such width as to be adapted to extend substantially through said openings in the wheel body member for engagement with a concealed shoulder on one of said wheel members to retain the ornamental member on the wheel, each of said projections including an intermediate bowed portion adapted to bear against said concealed shoulder as well as side portions spaced from said concealed shoulder.

5. As an article of manufacture, an ornamental circular member for a wheel including a rim member having a plurality of radial flanges as well as a base flange and a body member including a plurality of spaced openings at its junction with the rim member, said circular member having a plurality of rearwardly extending resilient arcuate projections formed integral on a circular rear edge of said circular member arranged to extend into said openings, said edge being part of a collapsed double thickness intermediate annular section of said member, each of said projections being curved rearwardly along said curved edge so as to constitute a curved extension of said edge and having an intermediate portion adapted to bear against one of said wheel members inside of the cooperating opening.

6. As an article of manufacture, or ornamental circular member for a wheel including a rim member having a plurality of radial flanges as well as a base flange and a body member including a plurality of spaced openings at its junction with the rim member, said circular member having a plurality of rearwardly extending resilient arcuate projections arranged to extend into said openings, said projections being also formed from a common double thickness skirt depressed rearwardly from said member, each of said projections having a portion adapted to bear against one of said wheel members inside of the cooperating opening, said projections extending generally in a direction paralleling and being curved about the axis of the wheel and being adapted to be deflected so as to enter said openings upon the ornamental member being pressed in an axial direction against the outer side of the wheel.

7. As an article of manufacture, an ornamental trim member for a wheel including a rim member having a plurality of radial flanges as well as a base flange and a body member including a plurality of spaced openings at its junction with the rim member, said trim member comprising a metallic circular member provided with a plurality of rearwardly extending flexible integral projections of such width as to be adapted to extend substantially through said openings in the wheel body member for engagement with a concealed and rear portion of the body member to retain the ornamental member on the wheel, each of said projections comprising a double thickness arcuate segment of said trim member depressed rearwardly therefrom, and spaced raised portions on one of said members for stressing and deflecting said projections into tight retaining engagement with said rear portion.

8. As an article of manufacture, an ornamental trim member for application to the outer side of a wheel having rim and body members, the rim member including a base flange and the body member having a plurality of circumferentially spaced axially extending openings in its outer peripheral portion adjacent the base flange, said trim member comprising a circular metallic member provided with a plurality of rearwardly extending projections at circumferentially spaced points on an inner margin of the trim member and of such width as to extend substantially through the openings in the wheel body member, said projections being all formed from a common double thickness annular skirt formed integral with said member, each of said projections being arcuate in the direction of said inner margin and having an intermediate bowed portion for retaining engagement with one of said wheel members upon the ornamental member being pressed axially into position on the wheel.

GEORGE ALBERT LYON.